Sept. 18, 1956  H. WIENER  2,763,187
WIDE VISION MIRROR
Filed March 28, 1955
FIG. 1.
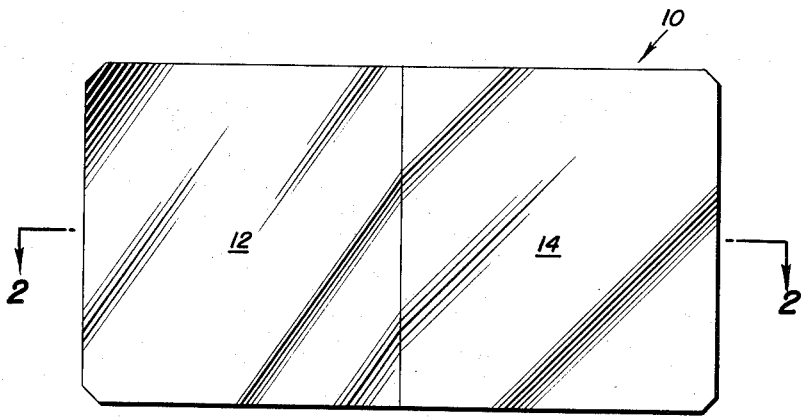

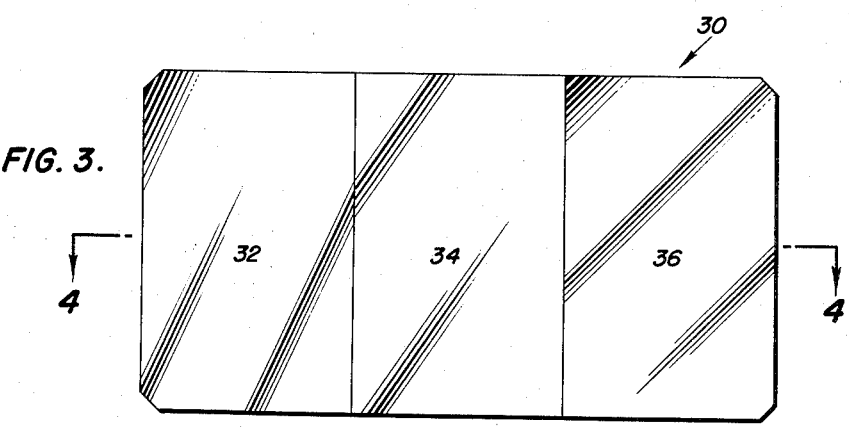
FIG. 3.

INVENTOR
HENRY WIENER
BY *Fred L. Witherspoon Jr.*
ATTORNEY

United States Patent Office 2,763,187
Patented Sept. 18, 1956

2,763,187

WIDE VISION MIRROR

Henry Wiener, Washington, D. C.

Application March 28, 1955, Serial No. 497,159

1 Claim. (Cl. 88—86)

This invention relates to mirrors and more particularly to rear view mirrors of the type generally used on motor vehicles to enable the operator to view the traffic to the rear of his vehicle.

In this age of high speed driving and multi-lane roadways it has become necessary that a rear view mirror be used that will give a wide field of vision so as to bring into view all of the traffic lanes on which vehicles are proceeding in the direction of the driven vehicle. In addition, it is quite essential that this mirror be of such construction that there will be a minimum of distortion, i. e., such as that produced by wide view mirrors of the convex type.

In the conventional type of mirror, such as a silver or sulfite surfaced glass plate, a plurality of reflected images are produced. The primary reflected image is produced by the coated surface while a secondary image of less intensity is produced by the front face of the glass plate. Consequently, this problem must be given consideration in producing a wide vision mirror consisting of two or more reflecting panels set at angles to each other.

There are numerous mirrors having a plurality of panels set at angles to each other in which the panels are separate and by some means connected to each other at the desired angle to produce a wide field of vision. However, these are expensive to manufacture and also present problems wtih regard to use and maintenance. Normal car vibrations, jars, weather changes, cleaning and other incidents in the ordinary operation of a car would tend to cause the separate mirror surfaces to break or loosen at the connecting joints and thus destroy the alignment of the mirrors, and also result in the deterioration of the reflective coating. In these mirrors the front faces of the panels are generally parallel to the rear reflecting faces and consequently are at an angle to each other. This arrangement may produce undesirable reflected images which could impair the utility of the mirror. To the best knowledge of the inventor, there are no wide vision mirrors available which have solved all of these problems.

In view of the above, it is an object of this invention to provide a wide vision rear view mirror which is made from a single piece of plate glass or the equivalent and has a plurality of reflecting portions arranged at an angle with respect to each other.

It is another object to provide a unitary wide vision rear view mirror having a plane front face extending over all of the reflecting portions.

It is a still further object to provide a wide view mirror such as that described in the previous objects which will withstand all of the normal hazards and conditions of everyday use, cannot lose the angular relation of its reflecting surfaces and is economical to manufacture.

Other objects and the nature and advantages of the invention will become apparent from the following detailed description taken in conjunction with the accompanying drawing, wherein:

Fig. 1 is a plan view of the mirror showing the two reflecting portions,

Fig. 3 is a plan view of a modification showing three reflecting portions.

Wide vision rear view mirrors are generally old as indicated by the patent to N. J. Buren #2,514,989 ad reference is made to Fig. 5 of this patent and the discussion thereof in the specification to show the optical aspects of mirrors of this type.

Figure 2:
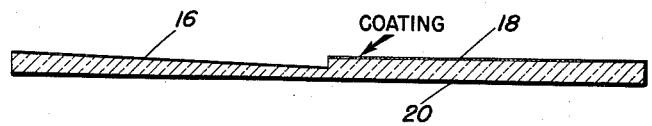
Fig. 2 is a horizontal cross section taken along line 2—2 of Fig. 1 showing the angular relationship of the reflecting surfaces and the plane front face.

Referring to Fig. 1, the mirror 10 is made from a single piece of glass or other suitable material and has two reflecting portions 12 and 14. As shown in Fig. 2, the reflecting surface 16 of portion 12 is at an angle with respect to the reflecting surface 18 of portion 14. These surfaces 16 and 18 are coated with a suitable coating commonly used on such mirrors. The angle of surfaces 16 with respect to surface 18 is a matter of choice depending on the width of the field of vision needed for a particular application.

The front face 20 of mirror 10 is a plane surface which extends over both reflecting portions 12 and 14. It is this plane front face which aids in preventing the production of undesirable reflections in the mirror. This plane front face produces a sturdy mirror which under normal car vibrations, jars, weather changes, cleaning and other incidents in the normal use of a car will not develop cracks or loose joints between the angularly arranged reflecting surfaces and thereby obviates the possibility of the reflecting surfaces losing their alignment and the deterioration of the reflective coating.

It is intended that the mirror may be used as an outside rear vision mirror or as an inside rear vision mirror. The mirror as shown in Fig. 1 with the two reflecting panels 12 and 14 of suitable proportions would generally be used as an outside mirror. When employed as an inside rear vision mirror the panel 14 would be longer than panel 12, the panel 14 being approximately twice as long as panel 12.

In making this mirror, a piece of glass of the desired size has a portion of one of its faces ground to form an angular surface such as reflecting surface 16 of mirror 10. This reflecting face and the other reflecting face 18 which is parallel to the front face of the mirror are then properly polished and coated with a reflective material suitable for the purpose.

Figure 4:
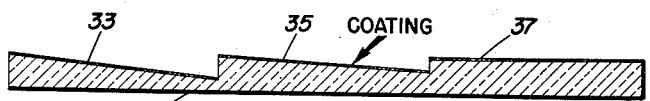
Fig. 4 is a horizontal cross section taken along line 4—4 of Fig. 3 showing the angular relation of the reflecting surfaces and the plane front face.

A modification of this invention is shown in Figs. 3 and 4. This mirror is of the same general construction and works on the same optical principle as the mirror of Figs. 1 and 2 except that the modification has three angularly arranged reflective portions to produce a field of vision of more varied scope. The mirror 30 is made from a single piece of glass or other suitable material and has three reflecting portions, 32, 34 and 36. As shown in Fig. 4 the mirror has a plane front face 38 behind which are positioned the angularly arranged reflecting surfaces. The reflecting surface 33 of reflecting portion 32, and the reflecting surface 35 of portion 34 are positioned at an angle with respect to the reflecting surface 37 of portion 36. The angular relationship of surfaces 33 and 35 is such that a progressively wider field of vision is produced.

It will be noted that in both embodiments shown in the drawing, one of the reflecting faces is parallel to the plane of the front face of the mirror. This is not necessary and it is contemplated that mirrors will be made in which none of the reflecting surfaces are parallel to the front face. However, in all cases the front face is a plane surface thus producing a strong construction in which the angles of the reflecting surface will remain unchanged as long as the mirror is in one piece. This plane front face will also aid in reducing secondary reflections which can be a serious problem in mirrors of this type. In addition it should be noted that this mirror may be made in various shapes and sizes depending on the particular needs involved.

As best indicated by the horizontal cross-sectional views, Figs. 2 and 4, the reflecting surfaces 16 and 18, and 33, 35 and 37 are set in the same horizontal plane. By this it is meant that the vertical plane of each reflecting surface is at the same angle with respect to a horizontal plane through the mirror. The adjacent reflecting surfaces are in fixed angular relation of slightly less than 180° to each other and diverge forwardly. The vertical confronting edges of the reflecting faces are offset by an amount proportionate to the angular relation of the adjacent reflecting faces. This obviously produces the effect of separate mirrors and this angular relation between reflecting faces produces a wider field of vision than that of a mirror having a single plane reflecting face.

It is understood that numerous changes may be made in the details of construction of this invention without departing from the spirit of the invention as defined by the claim.

What I claim and desire to secure by Letters Patent of the United States is:

A unitary wide vision mirror adaptable for use as a rear view mirror, said mirror comprising a single generally rectangular piece of glass having its length in a horizontal direction and its height in a vertical direction, said glass having a plane front face, the back face consisting of a pair of separate plane reflecting faces set in a horizontal plane, said reflecting faces being in fixed angular relation of slightly less than 180° to each other and diverging forwardly, said reflecting faces having their vertical confronting edges offset from each other by an amount proportionate to the angular relation of the two reflecting faces thereby producing the effect of separate angularly arranged mirrors thereby producing a wider field of vision than that produced by a mirror having a single plane reflecting surface.

References Cited in the file of this patent

UNITED STATES PATENTS

| | | |
|---|---|---|
| 1,114,559 | Weed | Oct. 20, 1914 |
| 1,401,942 | Benzer et al. | Dec. 27, 1921 |
| 1,791,936 | Rolph | Feb. 10, 1931 |
| 2,247,969 | Stewart | July 1, 1941 |